(12) United States Patent
Kwon et al.

(10) Patent No.: US 12,227,672 B2
(45) Date of Patent: Feb. 18, 2025

(54) METHOD FOR MANUFACTURING A MULTILAYER CERAMIC CAPACITOR

(71) Applicant: SAMSUNG ELECTRO-MECHANICS CO., LTD., Suwon-si (KR)

(72) Inventors: Tae Gyun Kwon, Suwon-si (KR); Eung Seok Lee, Suwon-si (KR); So Hyeon Hong, Suwon-si (KR); Byung Rok Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 503 days.

(21) Appl. No.: 17/561,007

(22) Filed: Dec. 23, 2021

(65) Prior Publication Data

US 2023/0098422 A1 Mar. 30, 2023

(30) Foreign Application Priority Data

Sep. 24, 2021 (KR) .......................... 10-2021-0126518

(51) Int. Cl.
*H05K 3/30* (2006.01)
*C09D 5/24* (2006.01)
(Continued)

(52) U.S. Cl.
CPC .................. *C09D 5/24* (2013.01); *C09D 7/20* (2018.01); *C09D 7/45* (2018.01); *C09D 7/68* (2018.01);
(Continued)

(58) Field of Classification Search
CPC .......... H01G 4/012; H01G 4/30; H01G 4/008; H01G 4/0085; H01G 4/12; H01G 4/248;
(Continued)

(56) References Cited

U.S. PATENT DOCUMENTS 9,058,936 B2 * 6/2015 Takeoka ............... H01G 4/1236
9,105,411 B2 * 8/2015 Chae ...................... H01G 4/005
(Continued)

FOREIGN PATENT DOCUMENTS

JP H09-17687 A 1/1997
JP H11-233388 A 8/1999
(Continued)

*Primary Examiner* — Paul D Kim
(74) *Attorney, Agent, or Firm* — Morgan, Lewis & Bockius LLP

(57) ABSTRACT

A method for manufacturing a multilayer ceramic capacitor including an operation of preparing a ceramic green sheet; an operation of forming a conductive paste on the ceramic green sheet; an operation of forming a ceramic laminate by stacking a ceramic green sheet on which the conductive paste is formed; an operation of sintering the ceramic laminate; and an operation of forming an external electrode on an exterior of the ceramic laminate, wherein the conductive paste includes a first mixture including a metal powder, a dispersant, and a hydrophobic solvent and a second mixture including a hydrophilic binder and a hydrophilic solvent, the conductive paste being an emulsion in which the first mixture is dispersed in the second mixture.

9 Claims, 7 Drawing Sheets

(51) Int. Cl.
  *C09D 7/20* (2018.01)
  *C09D 7/40* (2018.01)
  *C09D 7/45* (2018.01)
  *C09D 129/04* (2006.01)
  *H01G 4/008* (2006.01)
  *H01G 4/012* (2006.01)
  *H01G 4/30* (2006.01)
  *H01G 4/248* (2006.01)

(52) U.S. Cl.
  CPC ............ *C09D 7/69* (2018.01); *C09D 129/04* (2013.01); *H01G 4/008* (2013.01); *H01G 4/012* (2013.01); *H01G 4/30* (2013.01); *H01G 4/248* (2013.01)

(58) Field of Classification Search
  CPC ... C09D 5/24; C09D 7/20; C09D 7/24; C09D 7/45; C09D 7/61; C09D 7/68; C09D 7/69; C09D 129/04; C08K 3/08
  See application file for complete search history.

(56) References Cited

U.S. PATENT DOCUMENTS 10,062,509 B2 * 8/2018 Shimada .................. H01G 4/30
10,315,928 B2 * 6/2019 Ajichi .................. C01G 23/006

FOREIGN PATENT DOCUMENTS

| JP | 4626215 B2 | 2/2011 |
| JP | 4967223 B2 | 7/2012 |

* cited by examiner

METHOD FOR MANUFACTURING A MULTILAYER CERAMIC CAPACITOR

CROSS-REFERENCE TO RELATED APPLICATION(S)

This application claims benefit of priority to Korean Patent Application No. 10-2021-0126518 filed on Sep. 24, 2021 in the Korean Intellectual Property Office, the disclosure of which is incorporated herein by reference in its entirety.

TECHNICAL FIELD

The present disclosure relates to a method for manufacturing a conductive paste and a method for manufacturing a multilayer ceramic capacitor.

BACKGROUND

The present disclosure relates to a method for manufacturing a conductive paste and a method for manufacturing a multilayer ceramic capacitor. In particular, the present disclosure relates to a conductive paste directly formed on a ceramic green sheet to form an internal electrode of a multilayer ceramic capacitor.

Currently, a multilayer ceramic capacitor is formed by alternately layering a ceramic green sheet and an internal electrode pattern formed thereon using a conductive paste. The ceramic green sheet has a ceramic powder such as barium titanate ($BaTiO_3$) or the like and an organic binder as a main component.

Conventionally, a conductive paste, in which a metal powder is dispersed in a mixture in which an organic binder is dissolved in a hydrophobic organic solvent, is used.

Accordingly, as illustrated in FIG. 1, when first and second internal electrode patterns 21 and 22 are formed on the pre-stacked ceramic green sheet 10 by forming and drying the conventional conductive paste, a "sheet attack" phenomenon in which an organic solvent in conductive pastes swells or dissolves an organic binder in the ceramic green sheets 10 may occur.

The "sheet attack" phenomenon causes a problem in which a dielectric layer of the multilayer ceramic capacitor, a final product, deteriorates insulation or increases a short-circuit occurrence rate.

In order to solve such a problem, a conductive paste, comprised of metal powder, an organic binder comprised of a resin such as ethyl cellulose, or the like, a solvent such as dihydroterpineol, or the like, may be used.

However, when dihydroterpineol is used as the solvent, if a content of the solvent is insufficient, viscosity of the conductive paste increases, thereby significantly degrading workability.

In addition, a conductive paste containing a metal component, a water-soluble resin, and water may be used, but there may be a problem in that an entire surface of a metal powder particle may need to be modified to be hydrophilic.

SUMMARY

When an internal electrode pattern is formed on a ceramic green sheet, an object of the present disclosure is to prevent a sheet attack phenomenon, in which an organic binder in the ceramic green sheet swells or dissolves, and a short-circuit defect of the resultantly-obtained multilayer ceramic capacitor, from occurring.

However, the object of the present disclosure is not limited to the above, and will be more easily understood in the course of describing specific embodiments of the present disclosure.

According to an aspect of the present disclosure, a method for manufacturing a conductive paste, includes: an operation of forming a first mixture including a metal powder, a dispersant, and a hydrophobic solvent; an operation of forming a second mixture including a hydrophilic binder and a hydrophilic solvent; and an operation of forming a third mixture by mixing the first and second mixtures.

According to another aspect of the present disclosure, a method for manufacturing a multilayer ceramic capacitor, includes: an operation of preparing a ceramic green sheet; an operation of forming a conductive paste on the ceramic green sheet; an operation of forming a ceramic laminate by stacking a ceramic green sheet on which the conductive paste is formed; an operation of sintering the ceramic laminate; and an operation of forming an external electrode on an exterior of the ceramic laminate. The conductive paste includes a first mixture including a metal powder, a dispersant, and a hydrophobic solvent and a second mixture including a hydrophilic binder and a hydrophilic solvent, the conductive paste being an emulsion in which the first mixture is dispersed in the second mixture.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
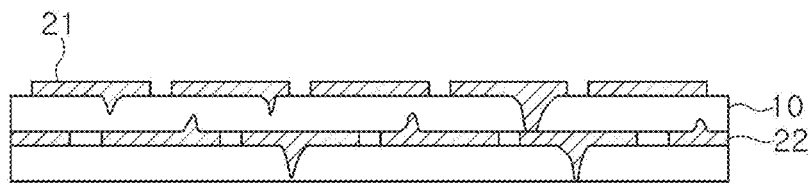
FIG. 1 is a cross-sectional view illustrating first and second internal electrode patterns formed on a ceramic green sheet by printing a conventional conductive paste.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals. In the present specification, expressions such as "having", "may have", "include" or "may include" may indicate a presence of corresponding features (e.g., components such as numerical values, functions, operations, components, or the like), and may not exclude a presence of additional features.

In the drawings, an X direction may be defined as a second direction, a Y direction may be defined as a third direction, and a Z direction may be defined as a first direction or a stacking direction.

Method for Manufacturing Conductive Paste

Hereinafter, a method for manufacturing a conductive paste according to an embodiment of the present disclosure will be described in detail with reference to FIGS. 2 to 5.

Figure 2:
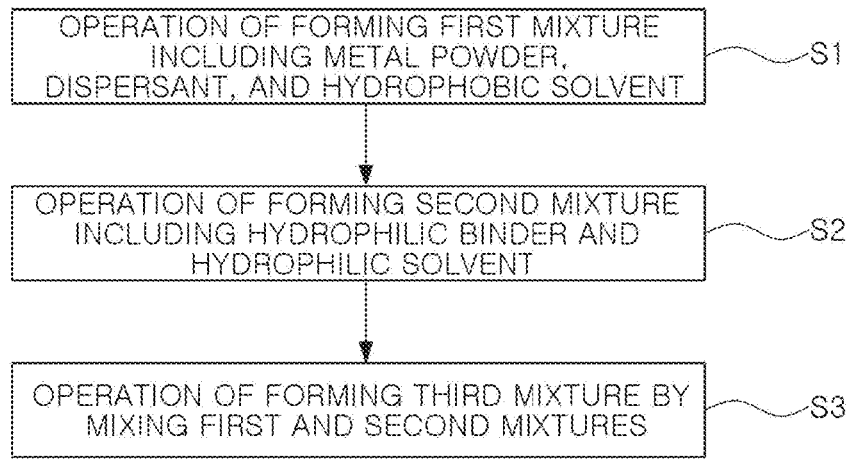
FIG. 2 is a process flow diagram illustrating a manufacturing process of a conductive paste according to an embodiment of the present disclosure.

Referring to FIG. 2, a method for manufacturing a conductive paste according to an embodiment of the present disclosure includes: an operation of forming a first mixture 110 including a metal powder 101, a dispersant 102, and a hydrophobic solvent 103 (S1), an operation of forming a second mixture 210 including a hydrophilic binder 201 and a hydrophilic solvent 202 (S2), and an operation of forming a third mixture 310 by mixing the first and second mixtures 110 and 210.

Hereinafter, each step of a manufacturing process of the conductive paste according to the present embodiment will be described in detail.

Figure 3:
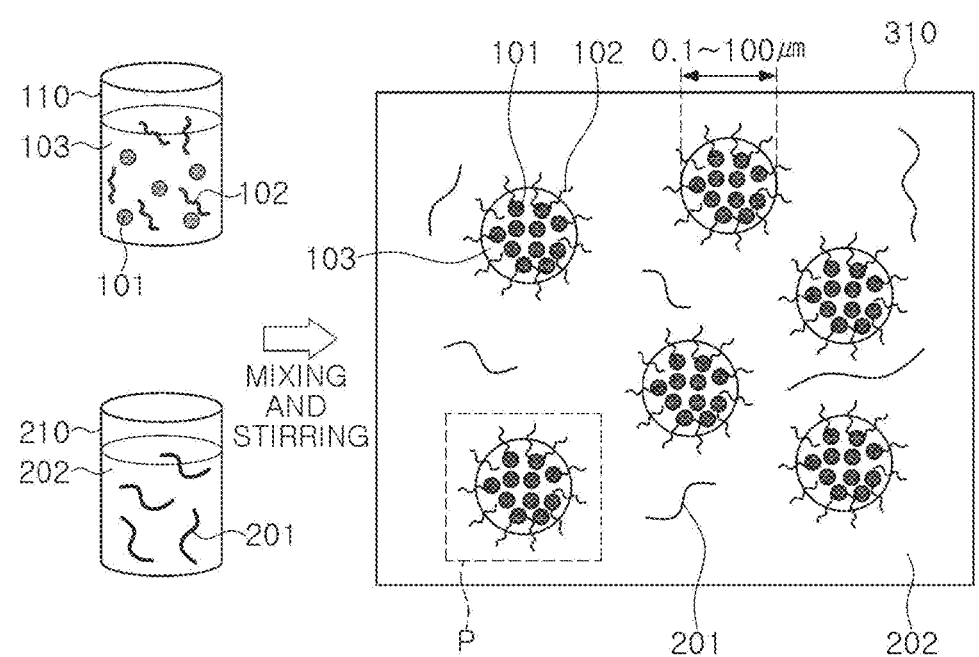
FIG. 3 is a schematic diagram schematically illustrating a manufacturing process of a conductive paste according to an embodiment of the present disclosure.

Referring to FIG. 3, a first mixture 110 including a metal powder 101, a dispersant 102, and a hydrophobic solvent 103 may be formed (S1).

The metal powder 101 is sufficient as long as it has conductivity and is not particularly limited, but may be, for example, any one or more selected from a group consisting of Ni, Cu, Au, Ag, Pd, Pt, and alloys thereof.

As the dispersant 102, for example, non-ionic surfactants, cationic surfactants, anionic surfactants, or the like, may be used, and these may be used alone or a mixture of two or more thereof may be used as the dispersant 102.

As will be described later, the dispersant 102 included in the first mixture is adsorbed to an interface between the first mixture 110 and the second mixture 210. In this case, a hydrophobic group of the dispersant 102 is adsorbed to a side of the first mixture 110, and the hydrophilic group is adsorbed to a side of the second mixture 210.

When the dispersant 102 is adsorbed to an interface between the first mixture 110 and the second mixture 210, the third mixture 310 may be more stably maintained in a form of an oil-in-water emulsion.

The hydrophobic solvent 103 is sufficient as long as it exhibits hydrophobicity and is not particularly limited, for example, an organic solvent such as acetate-based solvents such as dihydroterpinyl acetate, isobornyl acetate, isobornyl propinate, isobornyl butyrate, isobornyl isobutylate, ethylene glycol monobutyl ether acetate, dipropylene glycol methyl ether acetate, or the like, terpene-based solvents such terpineol, dihydroterpineol, or the like; hydrocarbon-based, such as tridecane, nonane, cyclohexane, or the like, carboxylic acid-based, and ester-based solvents may be used.

However, the configuration of the first mixture 110 is not limited thereto, and for example, various additives such as ceramic materials may be further included.

Referring to FIG. 3, the first mixture 110 is present in a form in which the metal powder 101 and the dispersant 102 are uniformly dispersed in the hydrophobic solvent 103.

Next, a second mixture 210 including a hydrophilic binder 201 and a hydrophilic solvent 202 may be formed (S2).

A binder is an organic component contributing to improving bonding properties between the ceramic green sheet and particles included in the conductive paste. The hydrophilic binder 201 is sufficient as long as it exhibits hydrophilicity and is not particularly limited. For example, polyvinyl alcohol, cellulose, or a water-soluble acrylic resin may be used as the hydrophilic binder 201.

The hydrophilic binder 201 does not affect the metal powder 111 in the particles of the first mixture 110, and serves as a matrix in which the aggregate of the metal powder can be dispersed when the conductive paste is dried.

The hydrophilic solvent 202 is sufficient as long as it can dissolve the hydrophilic binder 201 and is not particularly limited. For example, water or dimethyl sulfoxide may be used as the hydrophilic solvent 202.

Referring to FIG. 3, the second mixture 210 is present in a form in which the hydrophilic binder 201 is dispersed in the hydrophilic solvent 202.

Next, a third mixture 310 may be formed by mixing the first mixture 110 and the second mixture 210 (S3).

The method for manufacturing a conductive paste according to an embodiment of the present disclosure may further include an operation of stirring the third mixture 310.

Referring to FIG. 3, the stirred third mixture 301 may exist in an emulsion state. Emulsion means a substance in which particles of another liquid that are not soluble in the former liquid in one liquid are dispersed as colloidal particles or larger particles.

According to an embodiment of the present disclosure, a volume ratio of the first mixture 110 to the second mixture 210 may be 1 or less. When the volume ratio of the first mixture 110 to the second mixture 210 is 1 or less, the third mixture 310 may exist as an oil-in-water emulsion in which the first mixture 110 exhibits hydrophobicity is dispersed in a form of spherical particles in the second mixture 210 exhibits hydrophilicity.

Referring to FIG. 3, a diameter of particles of the first mixture 110 dispersed in the second mixture 210 may be 0.1 to 100 μm. When the diameter of the particles of the first mixture 110 is 0.1 to 100 μm, the first mixture 110 may be dispersed in the second mixture 210 as particles of a certain size to form an emulsion having a uniform shape.

The conventional conductive paste was prepared by dispersing a metal powder and a binder in an organic solvent exhibiting hydrophobicity. In this case, when the conductive paste is printed on the ceramic green sheet to form an internal electrode, the organic solvent included in the conductive paste and the organic binder included in the ceramic green sheet have compatibility with each other, so that there was a problem in that the conductive paste melts or swells the pre-stacked ceramic green sheet.

As will be described later, when the conductive paste prepared according to an embodiment of the present disclosure is formed on the ceramic green sheet, a conductive paste in a state of the third mixture 310 is formed on the pre-stacked ceramic green sheet.

That is, although the second mixture 210 exhibiting hydrophilicity is present on the ceramic green sheet, they do not have compatibility with each other. In addition, since the first mixture 110 is present in a form of spherical particles dispersed in the second mixture 210, the first mixture 110 is not present on the ceramic green sheet. Accordingly, the hydrophobic solvent 103 of the first mixture 110 does not swell or dissolve the organic binder in the stacked ceramic green sheet.

Even during the process of drying the conductive paste formed on the ceramic green sheet, the third mixture 310 may maintain a form of an emulsion due to a dispersant 102 in the first mixture 110. As a result, only the hydrophobic solvent 103 and the hydrophilic solvent 202 are removed during the drying process, and the dried conductive paste has a form in which aggregates of metal powder are evenly and densely dispersed in a matrix formed of the hydrophilic binder 201.

Accordingly, even when a plurality of ceramic green sheets having a conductive paste formed thereon are stacked in the manufacturing process of the multilayer ceramic capacitor, a sheet attack phenomenon may not occur with respect to the pre-stacked ceramic green sheets.

Figure 4:
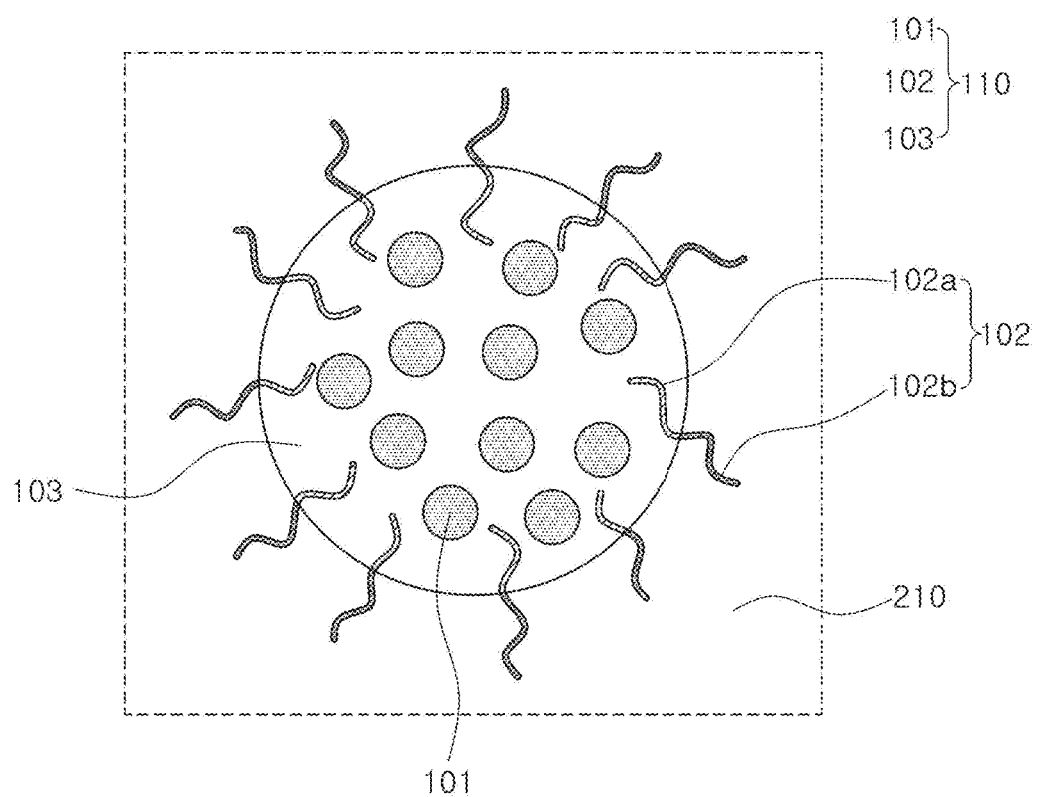
FIG. 4 is an enlarged view illustrating region P of FIG. 3.

Referring to FIG. 4, the dispersant 102 included in the first mixture is adsorbed to an interface between the first mixture 110 and the second mixture 210. In this case, a hydrophobic group 102a of the dispersant is adsorbed to a side of the first mixture, and a hydrophilic group 102b is adsorbed to aside of the second mixture. When the dispersant is adsorbed to an interface of the first mixture 110 and the second mixture 210, a shape of an oil-in-water emulsion can be more stably maintained.

A content of the dispersant 102 in the first mixture 110 may be preferably 0.01 wt % or more.

When the content of the dispersant 102 in the first mixture 110 is 0.01 wt % or more, the shape of the oil-in-water emulsion can be more stably maintained. That is, the shape of the oil-in-water emulsion is maintained even during a plurality of staking processes, thereby suppressing a sheet attack phenomenon on the pre-stacked ceramic green sheet.

EXPERIMENTAL EXAMPLE

A first mixture including 27.68 wt % of Ni powder, 0.5 wt % of conventional surfactant (ED116, an amine-based dispersant), and hexyl acetate as a solvent, and a second mixture including 5 wt % of polyvinyl alcohol as a binder and water as a solvent were formed.

The first mixture and the second mixture were mixed at a volume ratio of 1:5 to form a third mixture, and stirred to prepare an emulsion-type conductive paste.

After coating the prepared conductive paste on a PET film with a blade, hot air drying at 60° C. to evaporate all the solvents present in the first and second mixtures to form a dry coating film of the conductive paste, followed by being observed with an optical microscopy (OM), was undertaken.

Figure 5:
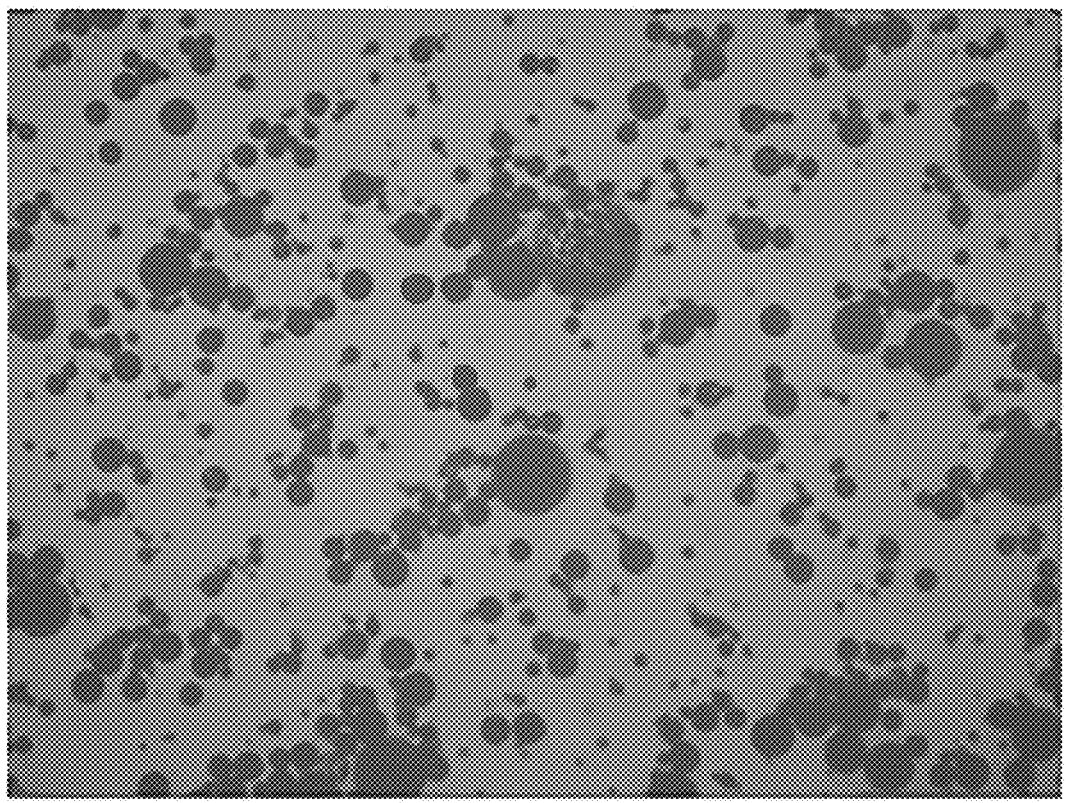
FIG. 5 is a photograph of a dried coating film of a conductive paste according to an embodiment of the present disclosure analyzed with an optical microscope.

Referring to FIG. 5, all solvents of the first and second mixtures were removed. That is, the hydrophilic binder is present even after drying, and forms a dry hydrophilic coating film.

In addition, the dispersant remains even during the drying process to maintain an emulsion form. Therefore, it can be confirmed that the Ni powder exists in a form of spherical Ni aggregates evenly and densely dispersed in the hydrophilic binder.

Method for Manufacturing Multilayer Ceramic Capacitor

A conductive paste prepared according to an embodiment of the present disclosure may be used for manufacturing an internal electrode in a multilayer ceramic capacitor.

Figure 6:
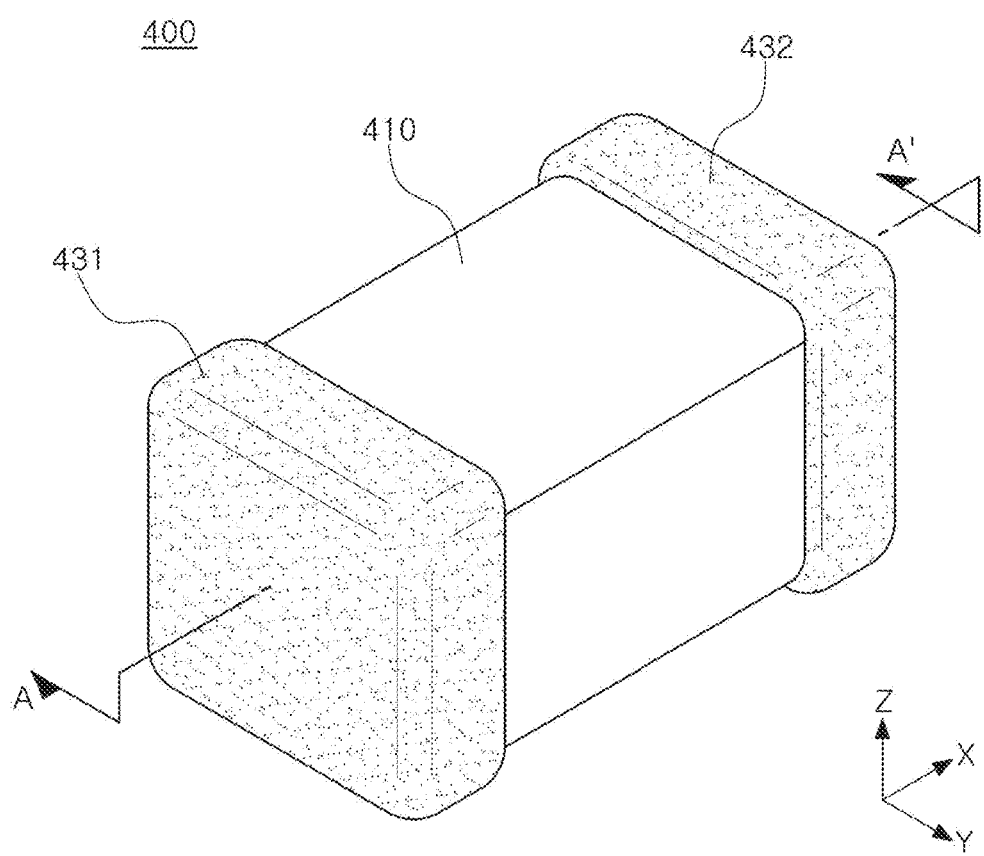
FIG. 6 is a perspective view of a multilayer ceramic capacitor manufactured using a conductive paste according to an embodiment of the present disclosure.
Figure 7:
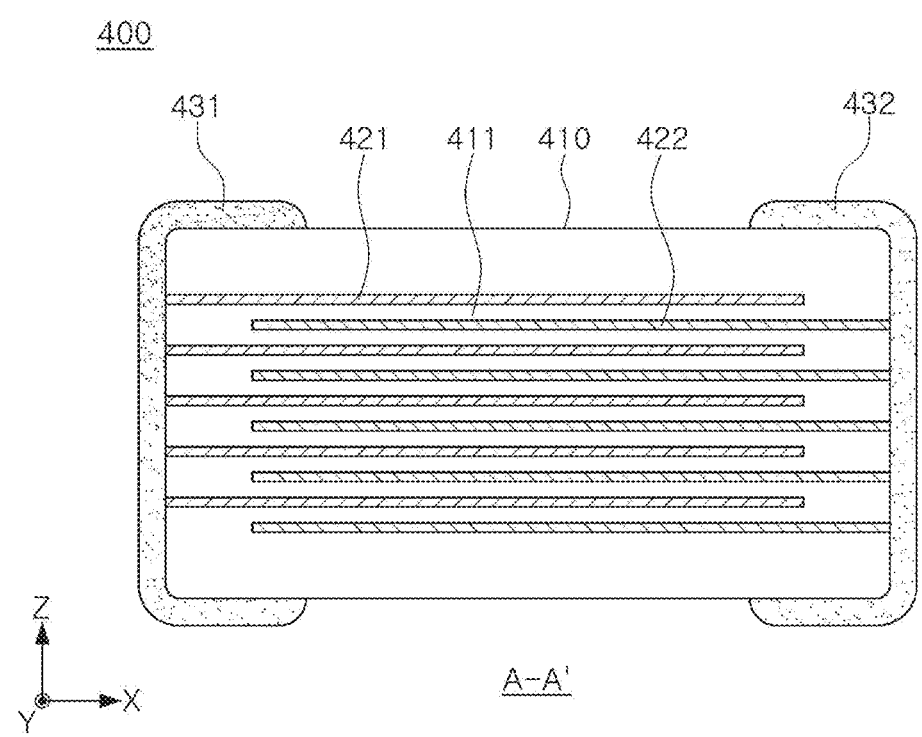
FIG. 7 is a cross-sectional view taken along line A-A' of the multilayer ceramic capacitor of FIG. 6.

FIG. 6 is a perspective view of a multilayer ceramic capacitor 400 manufactured using a conductive paste according to an embodiment of the present disclosure, and FIG. 7 is a cross-sectional view taken along line A-A' of the multilayer ceramic capacitor 400 of FIG. 6.

Referring to FIGS. 6 and 7, the ceramic body 410 may include a plurality of dielectric layers 411 and first and second internal electrodes 421 and 422 formed on the dielectric layers 411, and may be formed by stacking a plurality of dielectric layers 411 on which first and second internal electrodes 421 and 422 are formed. Also, the first and second internal electrodes 421 and 422 may be disposed to face each other with one dielectric layer 411 interposed therebetween. The first and second internal electrodes may be formed by a conductive paste prepared according to an embodiment of the present disclosure.

First and second external electrodes 431 and 432 are formed on an exterior of the ceramic body 410 to be electrically connected to the first and second internal electrodes 421 and 422, respectively. Specifically, the first and second external electrodes 431 and 432 may be formed by applying a separate conductive paste to an outer surface of the ceramic body 410 to be electrically connected to the first and second electrodes 421 and 422, respectively, and then sintering the same.

Figure 8:
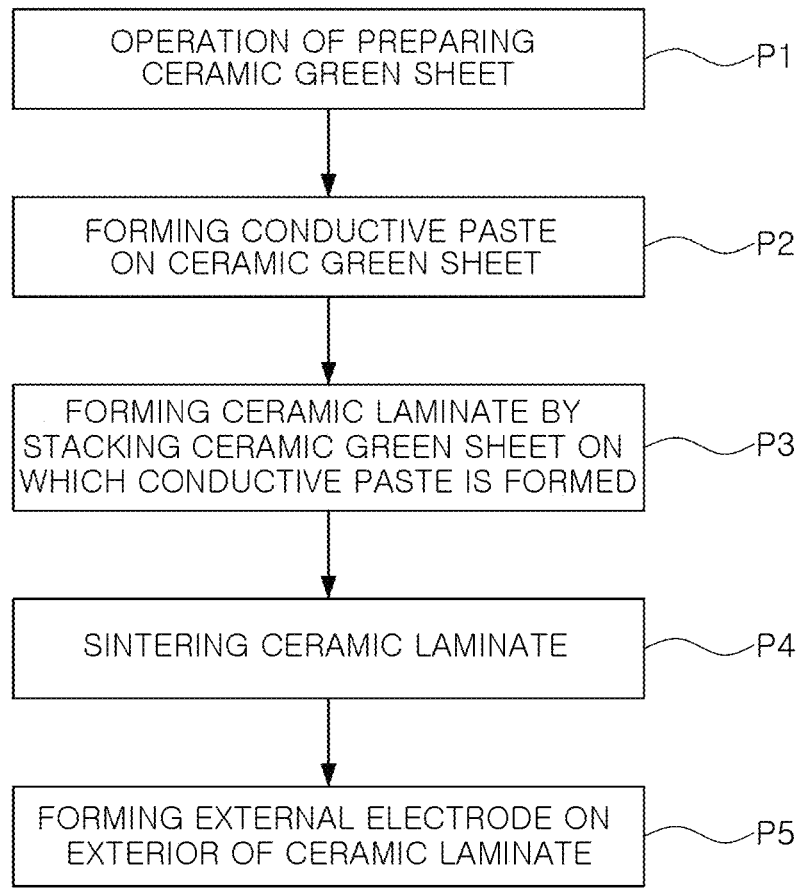
FIG. 8 is a process flowchart illustrating a manufacturing process of a multilayer ceramic capacitor according to an embodiment of the present disclosure.

FIG. 8 is a process flow diagram of a process for manufacturing a multilayer ceramic capacitor 400 according to an embodiment of the present disclosure.

Referring to FIG. 8, a method for manufacturing a multilayer ceramic capacitor includes: an operation of preparing a ceramic green sheet (P1), an operation of forming a conductive paste on the ceramic green sheet (P2), an operation forming a ceramic laminate by staking a ceramic green sheet on which the conductive paste is formed (P3), an operation of sintering the ceramic laminate (P4), and an operation of forming an external electrode on an exterior of the ceramic laminate. The conductive paste includes a first mixture including a metal powder, a dispersant, and a hydrophobic solvent, and a second mixture including a hydrophilic binder and a hydrophilic solvent, the conductive paste being an emulsion in which the first mixture is dispersed in the second mixture.

Hereinafter, each step of the process for manufacturing the multilayer ceramic capacitor according to the embodiment of the present disclosure will be described in detail.

First, a slurry formed including ceramic powder such as barium titanate ($BaTiO_3$), an organic binder, and the like is applied to a carrier film and dried to prepare a ceramic green sheet (P1).

Next, a conductive paste is formed on the ceramic green sheet (P2). The conductive paste includes a first mixture including a metal powder, a dispersant, and a hydrophobic solvent, and a second mixture including a hydrophilic binder and a hydrophilic solvent, the conductive paste being an emulsion in which the first mixture is dispersed in the second mixture.

A method for forming a conductive paste is not particularly limited, and for example, a screen-printing method, a gravure printing method, or the like may be used.

Next, a ceramic green sheet on which the conductive paste is formed is stacked to form a ceramic laminate (P3), and an external electrode is formed on an exterior of the laminate (P4). The operation of forming the external electrode may be performed using a paste for external electrodes. The application of the paste for external electrodes may be performed by dipping the laminate into the paste for external electrodes, but is not limited thereto.

Figure 9:
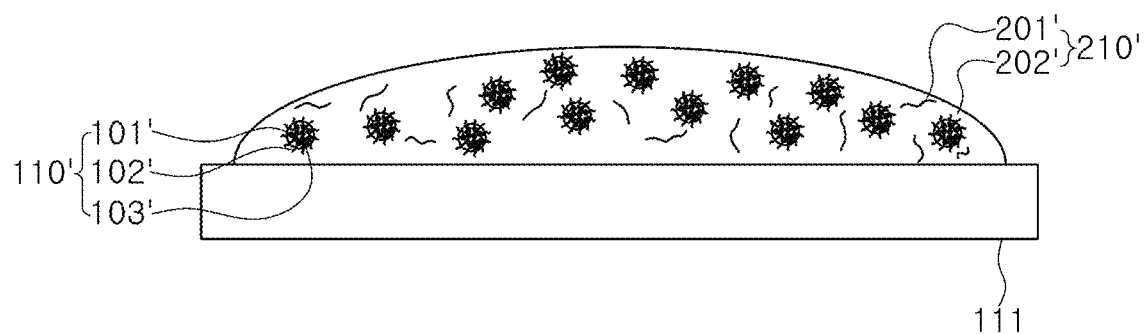
FIG. 9 is a cross-sectional view illustrating a ceramic green sheet on which a conductive paste is formed.

FIG. 9 illustrates that a conductive paste according to an embodiment of the present disclosure is formed on a pre-stacked ceramic green sheet 111.

When the conductive paste according to an embodiment of the present disclosure is formed on the ceramic green sheet, the second mixture 210' exhibiting hydrophilicity is present on the ceramic green sheet 111, although the second mixture 210' is present on the ceramic green sheet 111, the second mixture 210' and an organic binder in the ceramic green sheet 111, and the like, do not have compatibility with each other.

In addition, since the first mixture 110 ' exists in a form of spherical particles dispersed in the second mixture 210', the first mixture 110' does not exist on the ceramic green sheet 111. Accordingly, a hydrophobic solvent 103 'of the first mixture 110' does not cause the organic binder in the stacked ceramic green sheet 111 to swell or be dissolved.

Even during a process of drying the conductive paste formed on the ceramic green sheet, the conductive paste may maintain a form of an emulsion due to a dispersant 102' in the first mixture 110'.

As a result, only the hydrophobic solvent 103' and a hydrophilic solvent 202' are removed during the drying process, and the dried conductive paste has a form in which aggregates of the metal powder 101' are evenly and densely dispersed in a matrix made of the hydrophilic binder 201'.

Accordingly, even when a plurality of ceramic green sheets on which conductive pastes are formed are stacked in a manufacturing process of a multilayer ceramic capacitor, a sheet attack phenomenon does not occur with respect to the pre-stacked ceramic green sheets.

As set forth above, according to an embodiment of the present disclosure, by providing a method for manufacturing a conductive paste and a method for manufacturing a multilayer ceramic capacitor according to an embodiment of the present disclosure, when an internal electrode pattern is formed on a ceramic green sheet, a sheet attack phenomenon may not occur, and deterioration of insulation of a dielectric layer of the resultantly-obtained multilayer ceramic capacitor may be prevented and a short-circuit defect rate may be reduced.

However, various and advantageous advantages and effects of the present invention are not limited to the above description, and will be more readily understood in the process of describing specific embodiments of the present invention.

While the embodiments have been illustrated and described above, it will be apparent to those skilled in the art that modifications and variations could be made without departing from the scope in the embodiment as defined by the appended claims.

What is claimed is:

1. A method for manufacturing a multilayer ceramic capacitor, comprising:
   an operation of preparing a ceramic green sheet;
   an operation of forming a conductive paste on the ceramic green sheet;
   an operation of forming a ceramic laminate by stacking a ceramic green sheet on which the conductive paste is formed;
   an operation of sintering the ceramic laminate; and
   an operation of forming an external electrode on an exterior of the ceramic laminate, wherein the conductive paste includes a first mixture including a metal powder, a dispersant, and a hydrophobic solvent and a second mixture including a hydrophilic binder and a hydrophilic solvent, the conductive paste being an emulsion in which the first mixture is dispersed in the second mixture.

2. The method for manufacturing a multilayer ceramic capacitor of claim 1, wherein a volume ratio of the first mixture to the second mixture is 1 or less.

3. The method for manufacturing a multilayer ceramic capacitor of claim 1, wherein the first mixture particle has a diameter of 0.1 to 100 µm.

4. The method for manufacturing a multilayer ceramic capacitor of claim 1, wherein a content of the dispersant in the first mixture is 0.01 wt % or more.

5. The method for manufacturing a multilayer ceramic capacitor of claim 1, wherein the metal powder is at least one selected from a group consisting of Ni, Cu, Au, Ag, Pd, Pt, and alloys thereof.

6. The method for manufacturing a multilayer ceramic capacitor of claim 1, wherein the dispersant includes one or more of a non-ionic surfactant, a cationic surfactant, and an anionic surfactant.

7. The method for manufacturing a multilayer ceramic capacitor of claim 1, wherein the hydrophobic solvent includes one or more of an acetate-based solvent, a terpene-based solvent, a hydrocarbon-based solvent, a carboxylic acid-based solvent, and an ester-based solvent.

8. The method for manufacturing a multilayer ceramic capacitor of claim 1, wherein the hydrophilic binder includes one or more of polyvinyl alcohol, cellulose, and a water-soluble acrylic resin.

9. The method for manufacturing a multilayer ceramic capacitor of claim 1, wherein the hydrophilic solvent includes one or more of water and dimethyl sulfoxide.

* * * * *